(12) United States Patent
Jones et al.

(10) Patent No.: US 10,713,618 B2
(45) Date of Patent: Jul. 14, 2020

(54) SYSTEM AND METHOD FOR INCREASING COUNTING ACCURACY

(71) Applicant: Walmart Apollo, LLC, Bentonville, AR (US)

(72) Inventors: Matthew Allen Jones, Bentonville, AR (US); Robert Taylor, Rogers, AR (US); Roger L. Snelgrove, Fayetteville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 103 days.

(21) Appl. No.: 16/034,681

(22) Filed: Jul. 13, 2018

(65) Prior Publication Data

US 2018/0322450 A1    Nov. 8, 2018

Related U.S. Application Data

(62) Division of application No. 14/136,540, filed on Dec. 20, 2013, now Pat. No. 10,049,339.

(51) Int. Cl.
*G06Q 10/08* (2012.01)

(52) U.S. Cl.
CPC ................. *G06Q 10/087* (2013.01)

(58) Field of Classification Search
None
See application file for complete search history.

(56) References Cited

U.S. PATENT DOCUMENTS 8,346,630 B1 * 1/2013 McKeown .......... G06Q 10/087
                                                           705/22
2008/0243646 A1   10/2008 Stein et al.
(Continued)

FOREIGN PATENT DOCUMENTS

JP        2006-164054 A       6/2006

OTHER PUBLICATIONS

International Search Report and Written Opinion issued in International Application No. PCT/US2014/071106, dated Apr. 20, 2015.
(Continued)

*Primary Examiner* — Paul Danneman
(74) *Attorney, Agent, or Firm* — McCarter & English, LLP; David R. Burns

(57) ABSTRACT

Aspects and embodiments are directed to systems for determining counting accuracy of products, including retail products. The system for determining counting accuracy can interface with other inventory systems to access or receive information on inventory of the retail products. The inventory information can include, for example, numbers of units in inventory, shelf space accorded to respective products, package size (i.e., number of units available per package), retail value, margin value, among other options. The system can manage physical counts made on respective products. In some examples, the system can determine a value associated with physically counting inventory of respective product(s), for example, as a function of a number of units on-hand, time since the product has been counted, and a presentation value. Responsive to determining the value associated with physically counting the respective product, the system triggers a physical count or can prohibit a physical count of a product.

12 Claims, 8 Drawing Sheets

(56) References Cited

U.S. PATENT DOCUMENTS

2009/0144178 A1  6/2009  Barwick et al.
2009/0210325 A1  8/2009  Borom
2012/0197768 A1* 8/2012  Hurtis .................. G06Q 10/087
                                                    705/28
2013/0278393 A1* 10/2013 Zumsteg ............ G06K 7/10079
                                                    340/10.6

OTHER PUBLICATIONS

International Preliminary Report on Patentability issued in related international patent application No. PCT/US2014/071103 dated Jun. 30, 2016.

* cited by examiner

SYSTEM AND METHOD FOR INCREASING COUNTING ACCURACY

RELATED APPLICATIONS

This application is a divisional of U.S. patent application Ser. No. 14/136,540 filed Dec. 20, 2013, the disclosure of which is incorporated herein by reference in its entirety.

BACKGROUND

Accurate inventory counts can be critical in retail sales and inventory management. Conventional approaches involve establishing an inventory number for a particular item, addition to the inventory via purchases by the retailer, and subtraction from the inventory based on purchases by consumers. These approaches are augmented by actual physical counts of products to provide accurate information on inventory. For example, damage, theft, and loss are not well tracked. Conventional inventory management approaches incorporate physical counts to attempt to capture more accurate numbers on inventory that can be used to manage future orders, among other options.

SUMMARY

It is realized that physical counting of inventory is time consuming, expensive, fraught with error, and often incorrect in developing accurate counts. It is further realized that as the volume of items to count increases the problems associated with counting (e.g., error rate) increase. According to some aspects and embodiments, systems for improving inventory counting are provided. In various embodiments, an inventory counting system is provided to track current inventory information, model counting accuracy based on current inventory information, and trigger physical counts when the counting model indicates that accurate counting can take place.

In further embodiments, the counting accuracy model is configured to incorporate information on one or more of: on-hand inventory for a product, presentation value associated with the product (e.g., accounting for empty space on shelves), and time since the product was last counted. In some examples, the model when executed by the system can be configured to generate a probabilistic determination of the accuracy of counting a given product balanced against time and a value of determining the count for that product. Based on the determination of counting value, the system can be configured to prompt physical counts to validate respective product inventory numbers.

In some embodiments, the counting model can be configured to include evaluation of any one or more of: shelf capacity (i.e., how much product can be placed on a display shelf); case pack size (i.e., a number of each item that are available in a shipping/display unit), retail price (e.g., the higher the price the greater the value in having accurate counts), time since last count, and margin rate (e.g., the higher the margin the greater the value in having accurate counts). In further embodiments, the system can enable administrative users to tune the counting model according to desired parameters on any of the preceding factors. In some embodiments, the system can establish default values for the parameters in the counting model to emphasize any one or more of: minimum and maximum times since last count values, shelf capacity, shelf capacity coupled with case pack size, and on-hand desired minimums for a product, among other options.

According to one aspect, a system for determining counting accuracy is provided. The system comprises at least one processor operatively connected to a memory; a valuation component, executed by the at least one processor, configured to access information on current inventory associated with at least one product; determine a counting value associated with counting the at least one product; and trigger physical counting of the at least one product responsive to evaluating the accuracy value against a counting threshold. In one embodiment, the valuation component is further configured to determine the counting value based at least in part on a determination of an on-hand factor, wherein the on-hand factor represents a number of units of a product in inventory. In one embodiment, valuation component is further configured to determine the on-hand factor based on the number of units of the product in inventory. In one embodiment, the valuation component is further configured to determine the on-hand factor based on the number of units of the product in inventory and a system defined on-hand value. In one embodiment, the valuation component is further configured to calculate $$\left(\frac{OH}{OH_{MC}}\right)^x$$

as part of determining the on-hand factor, wherein OH is the number of units of the product inventory, $OH_{MC}$ is the system defined on-hand value, and wherein x is an exponent having a value of 1, 2, 3, 4, 5, 6, 7, 8, 9, 10, 11, or 12. In one embodiment, the valuation component is further configured to determine the counting value based at least in part on a determination of a presentation factor associated with the at least one product. In one embodiment, the valuation component is further configured to determine the presentation factor based on at least shelf capacity associated with the at least one product. In one embodiment, the valuation component is further configured to determine the presentation factor based on at least shelf capacity and case pack size associated with the at least one product. In one embodiment, the valuation component is further configured to calculate $$\left(\frac{(SC/CP)}{R_{target}}\right)^x$$

as part of determining the presentation factor, wherein SC is the shelf capacity for the at least one product, CP is the case pack size for the at least one product, $R_{target}$ is a system defined value for a target SC/CP ratio, and wherein x is an exponent having a value of 1, 2, 3, 4, or 5. In one embodiment, the valuation component is further configured to determine the counting value based at least in part on a determination of a time factor associated with the at least one product. In one embodiment, the valuation component is further configured to determine the time factor based at least in part on a time since a last physical count associated with the at least one product. In one embodiment, the valuation component is further configured to determine the time factor based at least in part on the time since the last physical count and a maximum time value associated with the at least one product. In one embodiment, the valuation component is further configured to calculate $$\left(\frac{t_{start}}{t_{stop} - t_{start}}\right)$$

as part of determining the time factor. In one embodiment, the valuation component is configured to determine the counting value based at least in part on an on-hand factor, a presentation value, and a time factor. In one embodiment, the system further comprises a communication component configured to receive a request to perform a physical count on inventory of the at least one product. In one embodiment, the communication component is configured to return an approval or a denial of the request responsive to the determination of the counting value.

According to one aspect, a computer implemented method for determining counting accuracy is provided. The method comprises accessing, by a computer system, information on current inventory associated with at least one product; determining, by the computer system, a counting value associated with counting the at least one product; and triggering, by the computer system, a physical counting of the at least one product responsive to evaluating the accuracy value against a counting threshold. In one embodiment, determining the counting value includes determining the counting value based at least in part on an on-hand factor, a presentation value, and a time factor. In one embodiment, the method further comprises an act of receiving, by the computer system, a request to perform a physical count on inventory of the at least one product. In one embodiment, the system further comprises an act of communicating an approval or a denial of the request, responsive to the determination of the counting value.

Still other aspects, embodiments and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Any embodiment disclosed herein may be combined with any other embodiment. References to "an embodiment," "an example," "some embodiments," "some examples," "an alternate embodiment," "various embodiments," "one embodiment," "at least one embodiment," "this and other embodiments" or the like are not necessarily mutually exclusive and are intended to indicate that a particular feature, structure, or characteristic described in connection with the embodiment may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. Where technical features in the figures, detailed description or any claim are followed by reference signs, the reference signs have been included for the sole purpose of increasing the intelligibility of the figures, detailed description, and claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. The figures are provided for the purposes of illustration and explanation and are not intended as a definition of the limits of the invention. In the figures:

DETAILED DESCRIPTION

Figure 1:
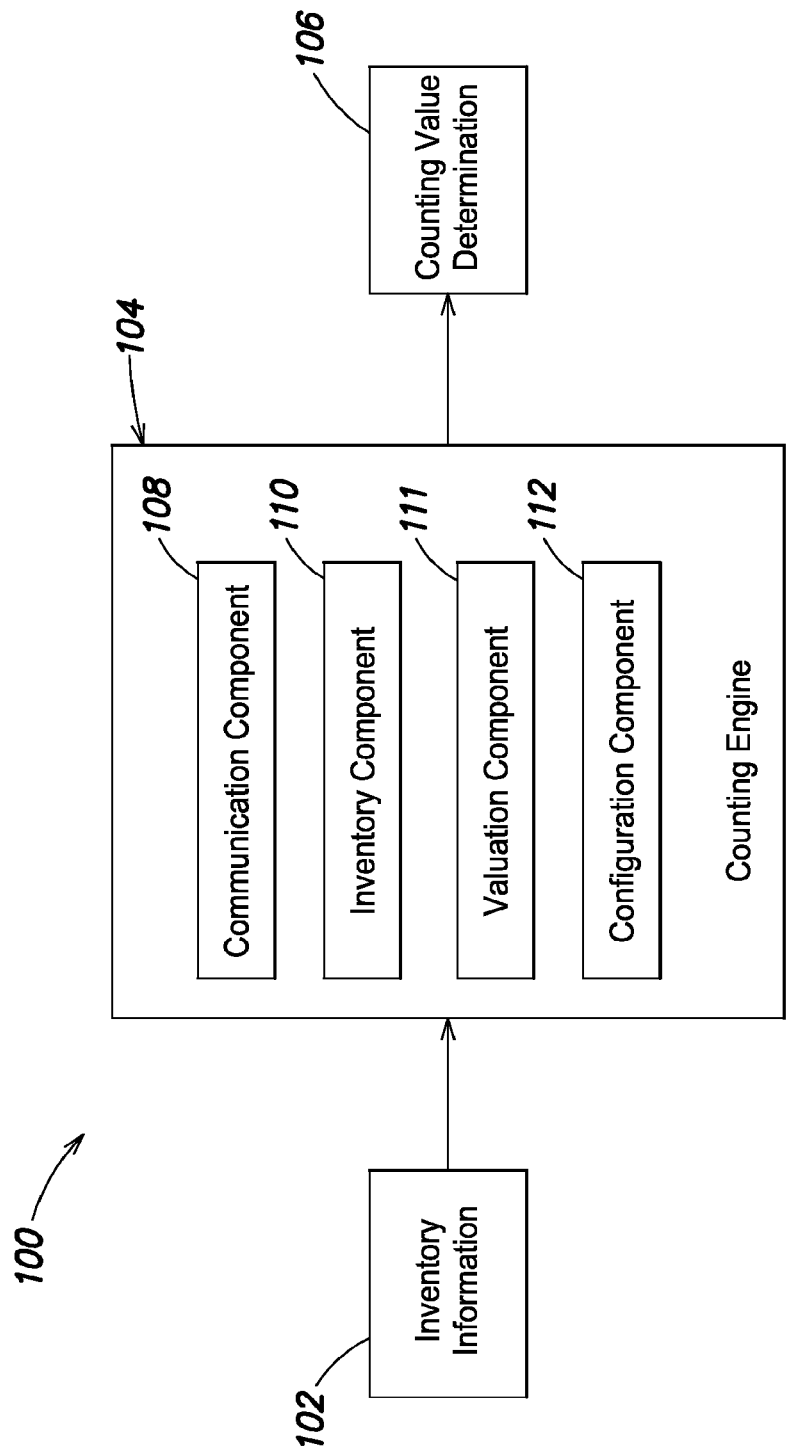
FIG. 1 is a block diagram of a system for determining counting accuracy, according to one embodiment.

Stated broadly various aspects and embodiments are directed to systems for determining counting accuracy of products, including, for example, retail products. According to some embodiments, the system for determining counting accuracy can interface with other inventory systems to access or receive information on inventory of the retail products. The inventory information can include, for example, numbers of units in inventory, shelf space accorded to respective products, package size (i.e., number of units available per package), retail value, margin value, among other options. In further embodiments, the system for counting accuracy can interface with in store and/or on-line sales systems and automatically update inventory information. Further, the counting system can be configured to manage respective products based on respective retail locations.

According to one embodiment, the system for counting accuracy manages physical counts made on respective products. In some examples, the system can determine a value associated with physically counting inventory of respective product(s), for example, as a function of a number of units on-hand, time since the product has been counted, and a presentation value. Responsive to determining the value associated with physically counting the respective product, the system triggers a physical count or can allow/prohibit a physical count of a product. For example, the system can receive a request or notice regarding counting a product from a retail location, evaluate inventory information on the respective product, and provide a response on whether the count value warrants physically counting the inventory of that product. The system can be configured to maintain values for any one or more of: on-hand inventory desired, minimum time since last count desired, maximum time since last count desired, desired shelf capacity, a case pack size, a case pack-shelf capacity ratio, among other options. In some embodiments, the system may maintain these values for each respective product and determine a count value for each respective product. In other embodiments, the system may maintain the value(s) based on classes of products, groups of product, among other options, and manage inventory counts of a respective product based on membership in a group, class, or other organization unit.

Examples of the methods, devices, and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

FIG. 1 is a block diagram of an example system 100 for counting accuracy, according to one embodiment. The system 100 can be configured to calculate a count value based on modeling information on count timing, presentation information, and on-hand inventory information. In some embodiments, system 100 can include a counting engine 104 configured to access or receive inventory information 102 and calculate an output for the value of performing a physical count of a respective product (e.g., "count value"). The system and/or counting engine 104 can be implemented on a computer system (e.g., general purpose computer system 500 and/or 502 of FIG. 5) specially configured to execute the functions and/or operations discussed herein.

According to one embodiment, the system 100 and/or engine 104 is configured to access inventory information to determine the count value (e.g., 106) at a specific time. In one example, the inventory information 102 can include any one or more of: numbers of units in inventory (e.g., tracked by an inventory management system or component), shelf space accorded to respective products, package size (i.e., number of units available per package), retail value, margin value, time since the product was last counted, among other options. Each product in inventory can be associated with respective inventory information. Further, the calculation of count value can be tailored to specific products. In some embodiments, system administrators can tailor settings for underlying calculations to modify when a determined value for the physical count causes the system to trigger an actual physical count.

In further embodiments, the system for counting accuracy can interface with on-line sales systems and automatically update inventory information. In one embodiment, the system 100 and/or engine 104 can include a communication component 108. For example, the communication component 108 can be configured to access inventory information from other system (e.g., front end sales systems, retail sales systems, inventory management systems, on-line sales systems, etc.). In other examples, system 100 and/or engine 104 can also include inventory and sales management components. The communication component 108 can be configured to access or receive inventory information from sales management components and/or inventory components. According to one embodiment, the system 100 and/or engine 104 can include an inventory component 110 configured to maintain and update inventory information for respective products, for example, at one or more retail locations based on information accessed or received by the communication component 108.

In some embodiments, the inventory component 110 can determine current numbers for units of a product in inventory based on information received from the communication component. In other embodiments, the inventory component can receive updates from other system elements on numbers of units in inventory and maintain such information (e.g., an inventory database 114). Inventory information maintained by the inventory component 110 can include data on how much shelf space has been assigned to a particular product in a respective retail location, how much storage is available in a retail location for storing off shelf inventory, how much space a product or product pack occupies, among other options. In some embodiments, inventory information can include information on how many units of a product are in a product package, retail value for the product, and a profit margin for the product.

In some embodiments, the system 100 and/or engine 104 can include a valuation component 111 configured to determine the value of physically counting a product (e.g., count value) based on at least some inventory information. The determined count value can be evaluated against thresholds to determine if a physical count should be triggered. In other examples, the system 100 and/or engine 104 can receive a request to count a product from a retail location (e.g., from a handheld inventory scanner). The system can evaluate the request based on an evaluation of the counting value against the threshold, and confirm the request to count if the threshold is exceeded and deny the request if the threshold is not exceeded.

According to some embodiments, the valuation component 111 is configured to model counting value based on at least an error rate associated with counting a number of items of a product (e.g., retrieved or received from inventory tracking); a presentation value associated with the product (e.g., a product with low shelf capacity is more of priority to count than a product with higher shelf capacity); and time since the product has been counted.

According to one embodiment, the system, engine, and/or valuation component is configured to model a counting error rate based on a number of the product that has to be counted. In some embodiments, the valuation component 111 is configured to calculate an "on-hand" value reflecting a tunable number of units to have available. In one example, the system calculates an output of an on-hand function, (wherein $OH_{mc}$ is a system value for prioritizing counting an item when the system's on-hand value for a product is less than $OH_{mc}$):

$$f(OH) = 1 - \left(\frac{OH}{OH_{MC}}\right)^{10}$$

Figure 6A:
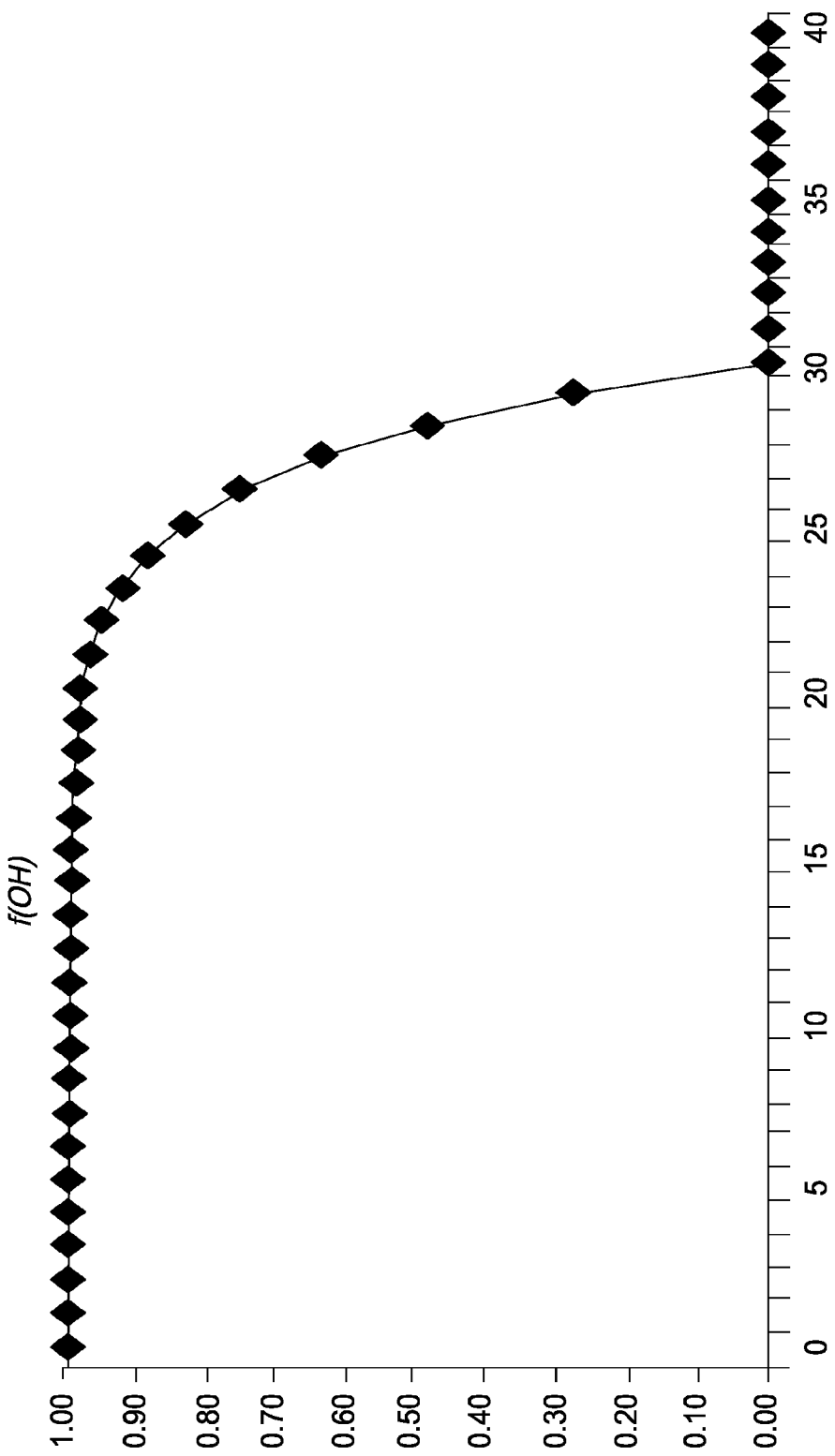
FIGS. 6A-C are example graphs of equation calculations, according to one embodiment.

In one example, the output of the F(OH) where $OH_{mc}$ is set to 30 is shown in FIG. 6A.

According to various embodiments, products can each have their own respective $OH_{mc}$. The system and/or the valuation component 111 can calculate a value for each product based on its own $OH_{mc}$ enabling custom calculations for an acceptable rate of error associated with a physical count of the product. FIG. 6A illustrates an on-hand function configured to generate a probabilistic value (from 0 to 1) associated with a likelihood of counting. If the on-hand value was the only factor, the value of 1 would reflect a product that should be counted 100%, whereas the value of 0 reflects a product that should not be counted. In some embodiments, the system can configure automatically an $OH_{mc}$ value based on analysis of inventory information and the results of physical counts. In one example, the system can establish a default $OH_{mc}$ (e.g., 30) which can be adjusted upwards or downwards, for example, based on historical counting accuracy. In other embodiments, a system administrator can access the system and/or the valuation component to input user defined $OH_{mc}$ values or to edit existing values.

In some embodiments, the valuation component is configured with calculation boundaries to limit outlier calculations and prevent individual factors from skewing a system based determination of the value associated with a physical count. For example, a calculation boundary described by:

If $f(OH)<0$, then $f(OH)=0$ prevents a product having a large number of units on-hand from skewing the determination of the value of the physical count, where other factors are present. In other examples, the system can be configured to calculate the output for the on-hand function only when a positive value will be returned, and assign a zero value otherwise.

According to one embodiment, the system 100, engine 104, and/or valuation component 111 is configured to model a presentation value as a function of a number of units of the product that have to be counted. In some embodiments, the valuation component 111 is configured to determine presentation value as a function of shelf capacity ("SC"—e.g., retail space allocated to the product) and case pack size ("CP"—e.g., number of units available in a display package). In some examples, the valuation component 111 is configured to calculate a value of a function on a ratio of SC/CP to prioritize physical counting of items having a lower shelf capacity and/or items having a lower shelf capacity to case pack size ratio.

In one example, the valuation component 111 is configured to calculate a value for f(SC/CP) where $R_{target}$ is a system defined target ratio desired for a given product:

$$f(SC, CP) = 1 - \left(\frac{(SC/CP)}{R_{target}}\right)^2$$

In some embodiments, the valuation component 111 is configured with calculation boundaries to limit outlier calculations and prevent individual factors from skewing a system based determination of the value associated with a physical count. For example, a calculation boundary can be described by:

If $f(SC,CP)<0$, then $f(SC,CP)=0$ to prevent negative values from skewing the determination of the value of the physical count, for example, where other factors are present.

Figure 6B:
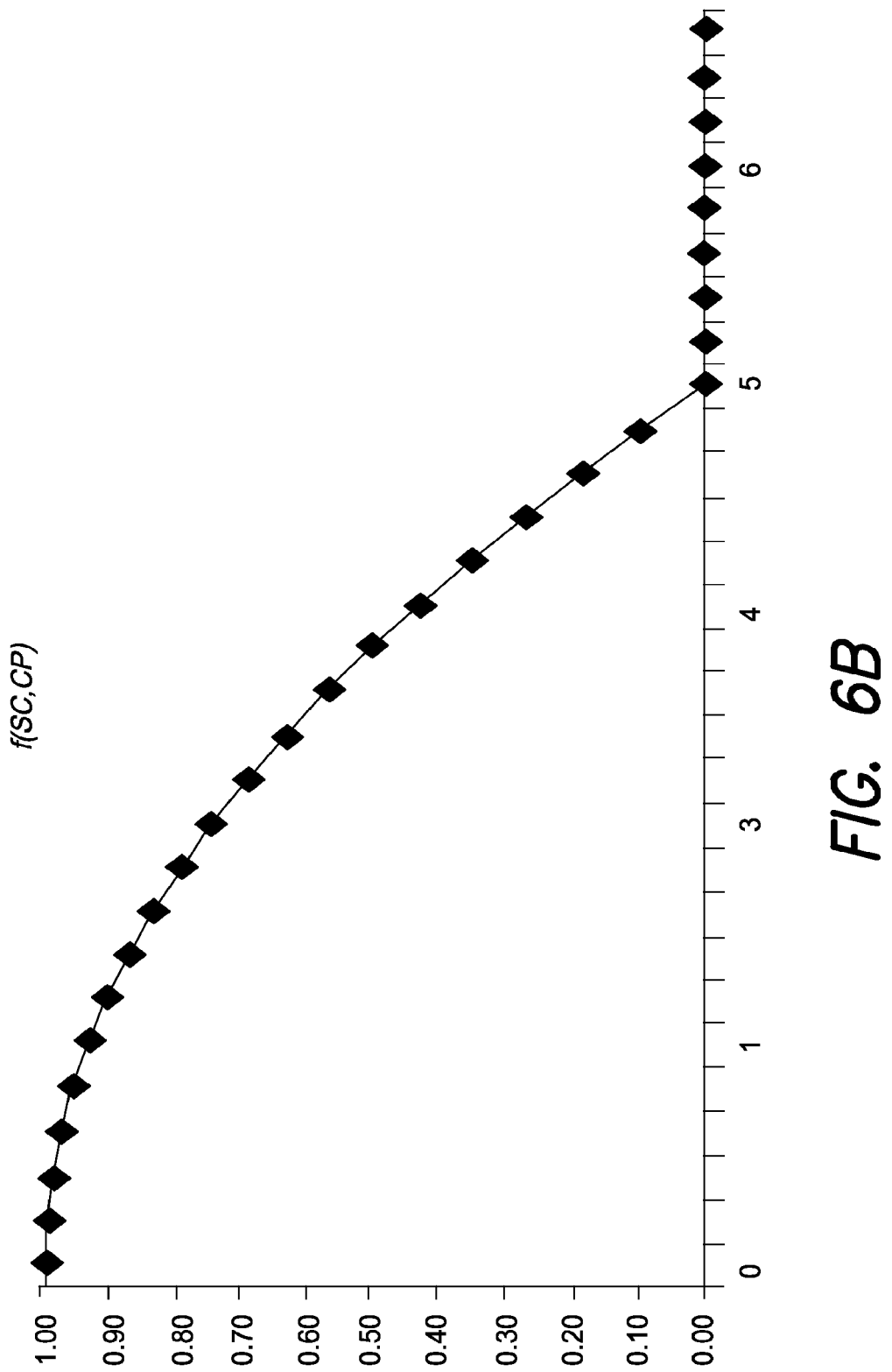

In one example, the output of the f(SC/CP) is illustrated graphically (FIG. 6B) where $R_{target}$ is set to a ratio of 5. In one example, the valuation component is configured to access and/or receive values for shelf capacity and case pack size for a respective product and determine the output of f(SC/CP) accordingly.

According to one embodiment, the $R_{target}$ value can be defined for each product, where the value can be set a default value and/or user entered. Further $R_{target}$ can be defined on product groups or other organization of products. Likewise, shelf capacity can be entered by an administrator for each product, product, ground, etc. Case pack size can be a known quantity based on the respective product being analyzed. In further examples, the case pack size can be user defined on the system 100.

In some embodiments, counting validation checks can be implemented by system 100, engine 104, and/or valuation component 111. For example, once a physical count value system is implemented, variables that contribute to the calculation may be subject to manipulation. For example, store personnel with an understanding of how physical count value is determined may increase shelf capacity for a product that is undesirable to physically count. The system can be configured to monitor for product(s) having an abnormal shelf capacity, by comparing an SC value against on-hand quantities, order information for the product, among other options.

In some embodiments, the calculation of presentation value can also include a variety of operations to account for small values of SC/CP. In one example, values for SC/CP<1 can be modified with a shift function (e.g., +1) and/or all values for SC/CP<1 set=1, such that whatever the value less than 1, the same emphasis is placed on the presentation value calculation (i.e. set equal to 1).

According to one embodiment, the system 100, engine 104, and/or valuation component 111 is configured to model a time value as a function of how long it has been since a product has been physically counted. In some embodiments, the valuation component 111 is configured to determine the time value as a function of how many days (or other time period) it has been since the product has last been counted, and one or more of: a minimum time threshold (e.g., $t_{min}$—sets a minimum time period between counts) and a maximum time period (e.g., $t_{max}$—sets a maximum time above which the value to count based on time reaches a maximum) beyond which any increase in time is treated the same.

In one example, the valuation component 111 is configured to calculate a value for f(T), where:

$$f(T) = \left[\frac{1}{(t_{stop} - t_{start})}T - \left(\frac{t_{start}}{t_{stop} - t_{start}}\right)\right]$$

and $t_{start}$ corresponds with a $t_{min}$ value and $t_{stop}$ corresponds with a $t_{max}$ value. According to some embodiments, $t_{start}$ & $t_{stop}$ can be defined on the system for each product. In other embodiments, $t_{start}$ & $t_{stop}$ can be based on product groups or other organizational unit. In further embodiments, administrative user(s) can access the system to set values for $t_{start}$ & $t_{stop}$. According to one embodiment, the system 100, engine 104, and/or valuation component 111 can be configured to automatically tune $t_{start}$ & $t_{stop}$ based on historical analysis, for example, to increase or decrease a minimum time between counts (if physical counting is occurring too frequently) or increase or decrease the maximum time value.

Figure 6C:
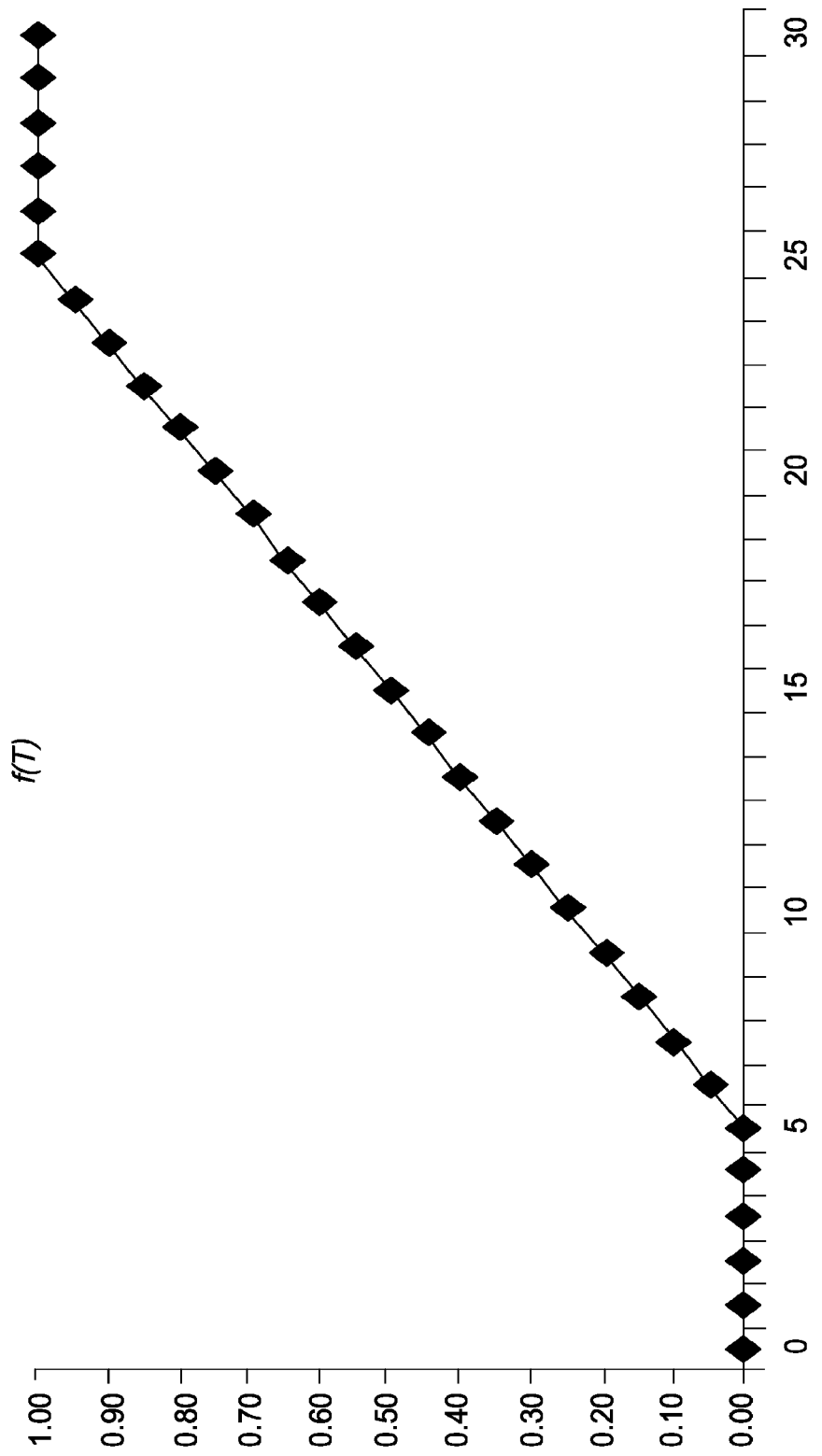

FIG. 6C illustrates graphically the calculation of f(T) where $t_{start}$=& $t_{stop}$=25.

In the example, f(T) emphasizes physical counts for products that have not been counted in the last 5 days up until a maximum time factor where the product has not been counted in the last 25 days. Where the time since last count exceeds 25 days, the impact on a value of counting remains the same. In some examples, $t_{start}$ provides a value at which products will not be counted regardless of other factors considered for a value associated with physically counting. If, for example, a request to count is received for a product counted in the last 5 days the system will reject the count request. In some examples, the system may trigger other processes to determine why a request to count was received in a short period and to take action accordingly.

According to some embodiments, the system is configured to determine a value associated with physically counting a product. The determination of value can include combinations of time factors, presentation factors, and on-hand factors. According to one embodiment, the system 100, engine 104, and/or valuation component 111 is configured to calculate the value associated with physically counting the product as probabilistic determination where time, presentation, and on-hand factors are combined into a single function.

In one embodiment, the function can be the sum of the contribution of considered factors. For example, the valuation component 111 can calculate:

$$P_{Count} = f(OH) \cdot f(SC,CP) \cdot f(T) \text{ or}$$

$$P_{Count} = f(OH) + f(SC,CP) + f(T)$$

where $P_{count}$ reflects a probability that a physical count of a product is worthwhile. The system can include defined limits (e.g., $P_{count} > 0.8$) to establish a threshold that must be reached and/or exceeded in order to trigger a physical count. In some examples, the system can establish the count threshold automatically. In further examples, the system can be configured to establish physical count thresholds on a product by product basis. In one example, the system can assign a lower count threshold to a product with a higher profit margin relative to another product with a lower margin. Similarly, the system can establish a lower count threshold to product with a high retail value relative to another product with a lower retail value.

In some embodiments, average values can be used between the counting factors (e.g., time, presentation, on-hand, etc.) where each value is added to a sum and averaged. In other embodiments, the system, engine, and/or valuation component can be configured to determine a weighted average from contributing factors. In some embodiments, the system can provide default weights for each factor (e.g., none, emphasize on-hand, emphasize SC:CP ratio, emphasize time since last count, among other options). In one example, the valuation component calculates:

$$P_{Count} = 0.45 f(OH) + 0.35 f(SC,CP) + 0.3 f(T)$$

to determine the value of Pcount to evaluate against the count threshold. In some embodiments, each of the values associated with the weightings and the threshold value can be input into the system by an administrative user. Further, the system can be configured to automatically tune weights and/or threshold values based on historical analysis of, for example, count frequency.

In further embodiments, the determination of Pcount can include contributions based on product margin, retail value, among other options.

As discussed above, system assigned values can be used in determining the calculations of presentation value, on-hand value, and/or time value. In one embodiment, the system 100 and/or engine 104 includes a configuration component 112 configured to accept user input to define system values (e.g., count threshold, weight values, $t_{start}$ & $t_{stop}$, $R_{target}$, $OH_{mc}$, shelf capacity, case pack size, etc.). In some embodiments, the configuration component can also be configured to analyze count frequency for specific products and/or groups of products, and adjust the system defined values to increase and/or decrease count frequency.

Figure 2:
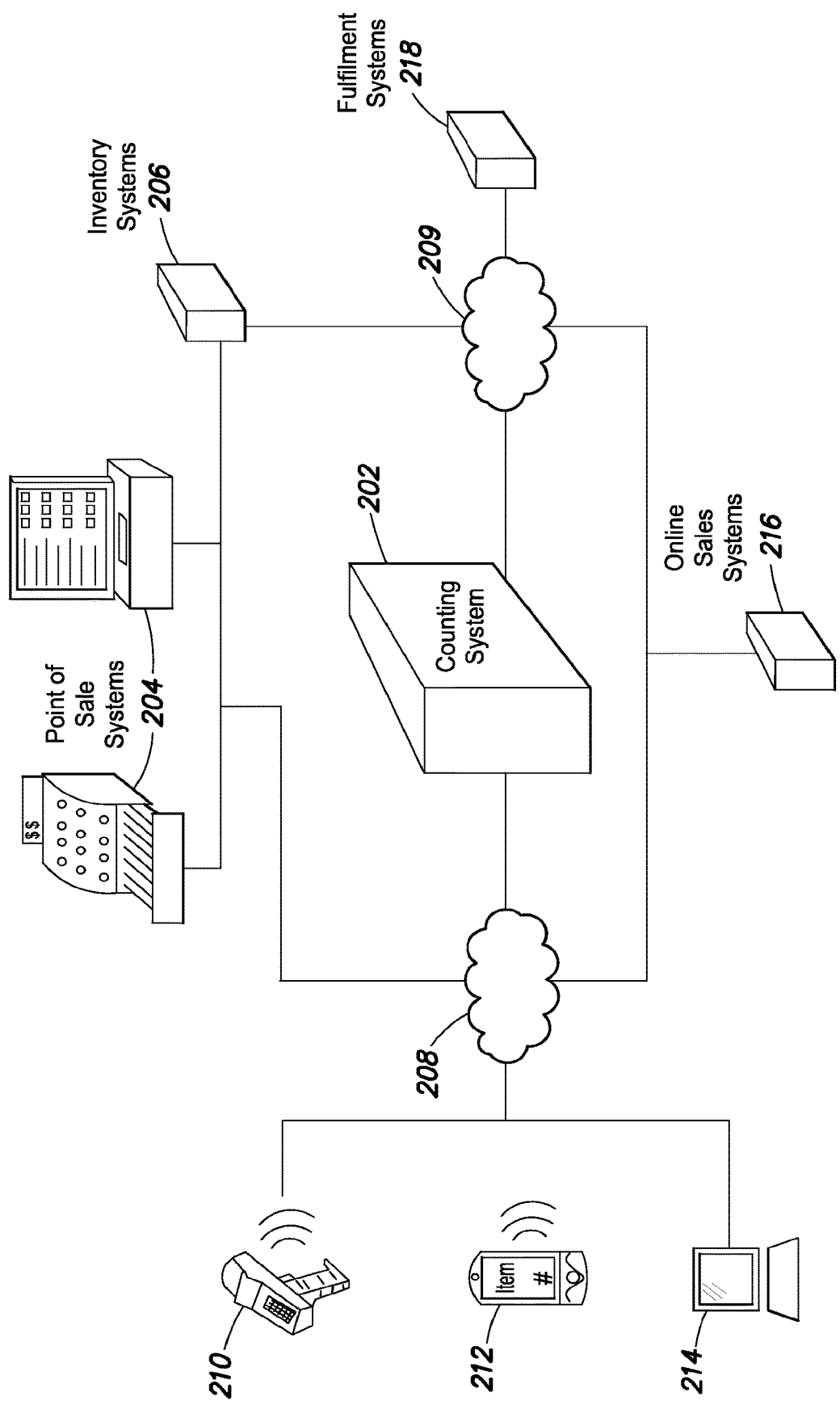
FIG. 2 is a block diagram of a system for determining counting accuracy, according to one embodiment.

FIG. 2 shows a counting environment 200 where a counting system 202 is configured to operate. In one embodiment, the counting environment includes a retail sales environment with physical inventory sold to customers via point of sale systems ("POS") 204. In some embodiments, the POS systems can be connected to separate inventory management systems (e.g., 206). The inventory management system can be configured to track information on the number of units within a retail location. For example, the inventory management system can start with a known value for the number of units of each product in the retail environment. Responsive to information from the POS systems 204 the inventory management system 206 can update inventory information on the number of units. In addition, the inventory management system 206 can include information on shelf capacity for respective products, case pack information for respective products, among other options. In some embodiments, the inventory management system 206 can be included in a counting system 202, or vice versa.

According to one embodiment, the counting system 202 can receive and/or request updated quantity information from the inventory management system 206 over network 208, in order to calculate a value associated with a physical count of a product. In some embodiments, the counting system 202 functions are triggered based on an alert received from the retail environment. For example, personnel at the retail location can be equipped with inventory management devices (e.g., hand held scanner 210, portable computing device 212 (e.g., smart phone with inventory application), and computer system 214, among other examples). In some embodiments, the inventory management devices can be used to generate a request to physically count product in the retail environment. In another embodiment, personnel assigned to physically count product can receive system validation on whether a respective product should be counted. For example, the counting system 202 can receive a request to validate a physical count request from a hand held scanner 210 over network 208. Responsive to the request, system 202 can access inventory information to determine the value associated with counting the respective product. If the value exceeds the system count threshold, the physical count is authorized. If the value does not exceed the count threshold (or, for example, a minimum time since last count is not exceeded) the request can be rejected, and the physical count will not take place.

The counting system 202 can also receive inventory information from on-line sales systems 216. For example, on-line systems (e.g., 216) may sell products for pick up in a retail environment. Counting system 202 can receive or access such information to ensure accurate and up to date inventory information is being used to calculate a value associated with physically counting a product. In other embodiments, the on-line sales systems (e.g., 216) can provide inventory information to inventory management systems 206, for example, over network 209, which in turn provide updated information to counting system 202. Additionally, the counting environment 200 can also include fulfillment systems 218. The fulfillment systems 218 can be configured to order new product as inventory numbers dwindle. In some embodiments, counting system 202 can use order history and/or order information to determine current values for calculating a physical count value. Further, order history and/or order information can be used monitor manipulation of physical count values, as discussed above.

Figure 3:
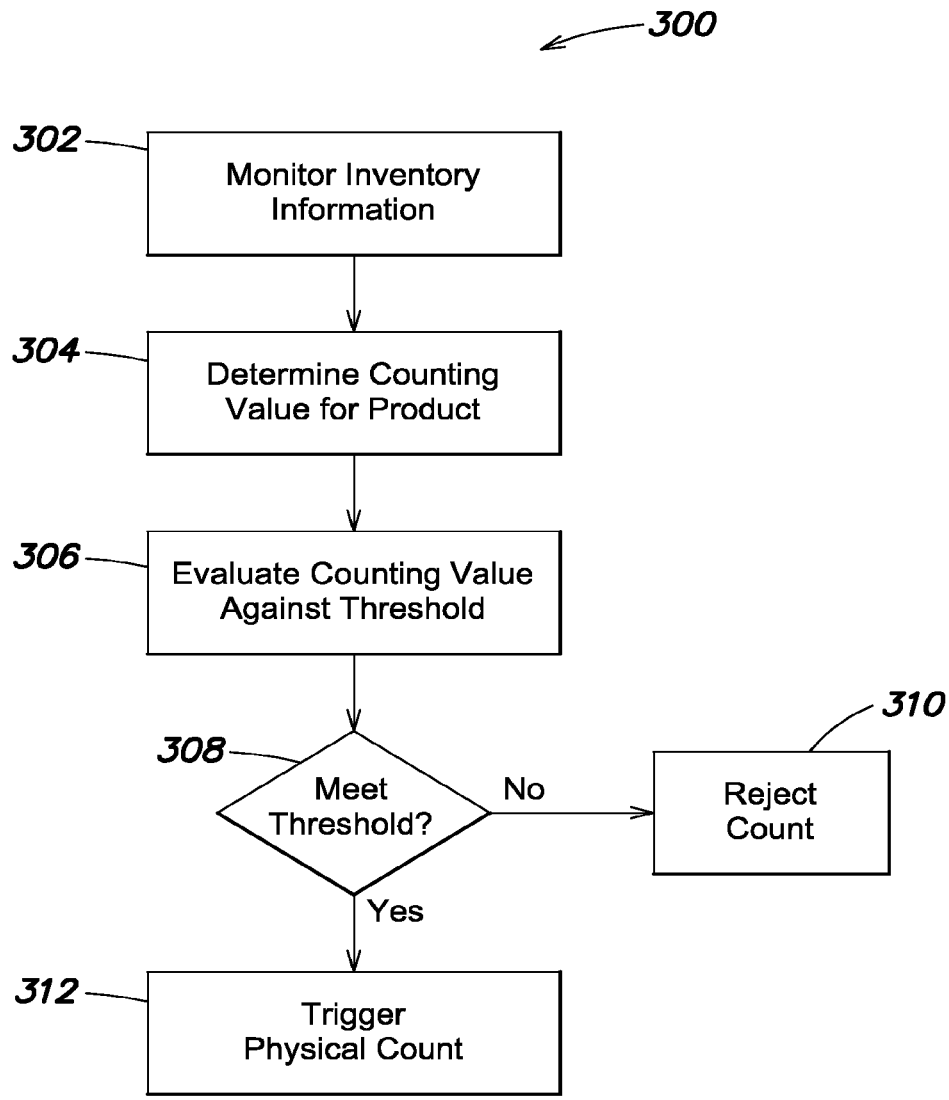
FIG. 3 is an example process flow for managing physical counts, according to one embodiment.

FIG. 3 shows one example of a process 300 for improving physical counting accuracy. Process 300 can be executed by counting systems (e.g., 100, 202) including, for example, the computer systems described below with reference to FIG. 5. The process 300 includes steps of monitoring inventory information, determining a counting value (e.g., $P_{count}$) for a product, evaluating the counting value against a threshold, and rejecting a count where the value does not meet the threshold, and triggering a physical count where the value exceeds the threshold.

Process 300 beings at 302, where inventory information is monitored. In one example, a counting system and/or counting engine can monitor inventory information provided from sales systems, inventory management systems, and/or fulfillment systems. In some embodiments, the associated systems (e.g., inventory, sales, and/or fulfillments systems) can provide inventory information automatically. In others, a counting system can request the information from associated systems. The inventory information provided can include information on numbers of units of respective products, and may also include information on shelf space assigned to a product (e.g., shelf capacity), case pack size, retail value, profit margin, among other options.

At 304, a counting value for a product is determined. The counting values can be based on any one or more of: presentation value, time since last count, and on-hand value. As discussed above, the presentation value is configured to ensure a product is available on a display in a retail location. The time since last count provides a control configured to ensure a minimum count time elapses between physical counts. An on-hand value provides a control to ensure a minimum number of a product is maintained in inventory. Each factor in determining the count value can include tunable parameters (e.g., count threshold, weight values, $t_{start}$ & $t_{stop}$, $R_{target}$, $OH_{mc}$, shelf capacity, case pack size, etc.) that can be set on, for example, a counting system. In some embodiments, the counting value is calculated based on the tunable parameters and collected inventory information.

In one example, a value for each of the functions is determined, as follows:

$$f(OH) = 1 - \left(\frac{OH}{OH_{MC}}\right)^{10}$$

$$f(SC, CP) = 1 - \left(\frac{(SC/CP)}{R_{target}}\right)^2$$

$$f(T) = \left[\frac{1}{(t_{stop} - t_{start})}T - \left(\frac{t_{start}}{t_{stop} - t_{start}}\right)\right]$$

the values for each are then combined at 304 to determine the counting value. In some examples, the values are combined according to one or more of: averaging, weighted averaging, multiplication, and shifted multiplication (e.g., to account for zeros and/or small values).

At 306, the counting value is evaluated against a counting threshold. In one example, the counting threshold is set at 0.8 for an averaged counting value where each function contributes a value from 0 to 1. Although, in various embodiments, the counting threshold can be set at different values, or re-set by system users. At 308 YES, the calculated counting value exceeds the counting threshold and a physical count of a product is triggered at 312. If the threshold is not exceeded 308 NO, then a physical count is rejected at 310. In some embodiments, process 300 is triggered by a request to count received from a retail space. Thus at 310, the request for a physical count is rejected or at 308 validated.

According to some embodiments, process 300 can be executed by a counting system, counting engine, and/or counting system components. In other embodiments, execution of process 300 can include execution of other processes or sub-processes. For example, the determination of a counting value at 304 can include calling other processes to determine component values on which the counting value is derived.

Figure 4:
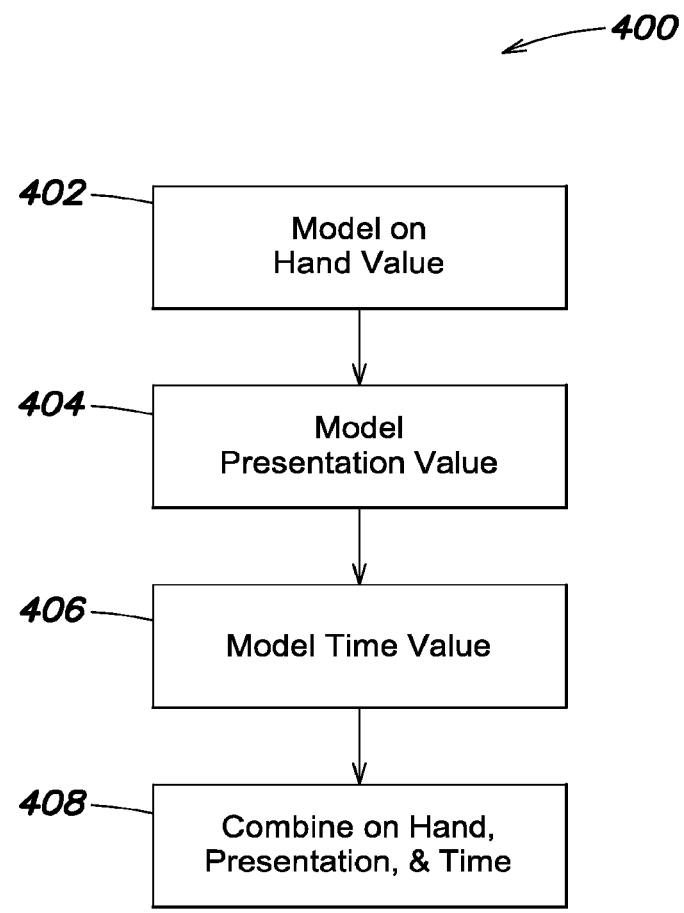
FIG. 4 is an example process flow for determining a value associated with a physical count, according to one embodiment.

FIG. 4 illustrates an example process flow 400 for generating a counting value. Process 400 can be executed by counting systems (e.g., 100, 202) including, for example, the computer systems described below with reference to FIG. 5. Process 400 begins with modeling an on-hand value at 402. The on-hand value is determined based on a system setting for a minimum number of product inventory that should be available. The system setting can be stored in a variable (e.g., $OH_{max}$) and the variable used in a function for determining the on-hand value (e.g., f(OH)) at 402. At 404, a presentation value can be modeled. In some embodiments, the modeling of the presentation value includes determining the value as a function of shelf capacity ("SC"—e.g., retail space allocated) for a respective product. Modeling of the presentation value can also include factoring for a case pack size for the respective product (CP—e.g., number of units available in a display package). In one example, a value for f(SC/CP) is determined at 404.

At 406, a value associated with a time since a last count for a product is determined. The time value can be based on, for example, a minimum period of time between physical counts. In some embodiments, a value for a period beyond which a maximum time value is achieved can also be used in determining the time value at 406. In one embodiment, the value is calculated based on f(T). The value of f(T) can depend on values for $t_{start}$ and $t_{stop}$, as discussed above. At 408, the respective values or factors can be combined to produce a single count value. In some examples, the respective values can be averaged, weighted and averaged, or combined in other fashions. According to one embodiment, the count value generated can be used in other processes (e.g., 300) and/or compared to threshold count values to manage physical counting of products.

According to some embodiments, different processes can be used to calculate a count value. Additionally, different equations can be implemented and/or executed to determine a counting value. In one embodiment, the system solves for gamma—which reflects a probability that a physical count should take place.

In one embodiment, the calculation of gamma ensures the system triggers physical counting when the value associated with physical counting is optimized. For example, the gammas calculation can include an optimization of accuracy and labor invested in a physical count. When the number of on-hand product are low, physical counting requires less labor and results in increased accuracy. Additionally, the system can factor into the gamma calculation that products with low shelf capacity are more important to count and count accurately, for example, to ensure that particular product is available to customers. In another example, the system can also factor retail price for a product into the determination of when to count. For example, as retail value increases for an item the value associated with having accurate inventory information, likewise, increases. In one example, the value can be expressed as OH (number of units on-hand)*Retail (retail price)=Value.

According to one embodiment, the system can calculate gamma as follows:

$$\gamma = \left(\left(\frac{1}{4}\right)*\left(\frac{1}{2}*e^{-OH*Retail*\lambda_V} + B_V\right)\right) + \left(\left(\frac{1}{4}\right)*\left(\frac{1}{2}*e^{-\$Retail*\lambda_R} + B_R\right)\right) + \left(\left(\frac{1}{4}\right)*(\lambda_{OH}*\ln(OH) + B_{OH})\right) + \left(\left(\frac{1}{4}\right)*(\lambda_{SC}*\ln(SC) + B_{SC})\right)$$

where OH is a number of the product being evaluated on-hand; retail is the retail value for the product; $\lambda_V$ is the value for normalizing the exponential as On Hand and Retail increase, for example, based on the observed or calculated On hand and Retail; and $B_V$ is the value for normalizing the exponential as On Hand and Retail decreases or approaches zero, for example, based on previously determined accuracy of On Hand values (Inventory Results is an example). $\lambda_R$ is a value for normalizing the exponential as Retail increases, for example, based on observed or calculated Retail; $B_R$ is the value for normalizing the exponential as Retail decreases or approaches zero ($\lambda_R$ and $B_R$ enable specific tuning of Retail independent of the previous On Hand-time-Retail factor); $\lambda_{OH}$ is the value for normalizing the natural logarithm function as On Hand increases, for example, based on observed or calculated On Hand; $B_{OH}$ is the value for the value for normalizing the natural logarithm function as On Hand decreases or approaches zero ($\lambda_{OH}$ and $B_{OH}$ enable specific tuning of On Hand independent of the previous On Hand-times-Retail factor); $\lambda_{SC}$ is the value for normalizing the natural logarithm function as Shelf Capacity increases, for example, based on observed or calculated Shelf capacity; and $B_{SC}$ is the value for normalizing the natural logarithm function as Shelf Capacity decreases or approaches zero, for example, based on observed or calculated Shelf Capacity.

According to other embodiments, different values can be calculated to improve counting efficiency. Further, in some examples, retail value and/or margin value can be used to set a count threshold, where products with high value (e.g., retail and/or margin) are counted with a greater frequency relative to products with a lower value.

Example Computer Implementations

Various aspects and functions described herein, in accord with aspects of the present invention, may be implemented as hardware, software, or a combination of hardware and software on one or more computer systems. There are many examples of computer systems currently in use. Some examples include, among others, network appliances, personal computers, workstations, mainframes, networked clients, servers, media servers, application servers, database servers, web servers, and virtual servers. Other examples of computer systems may include mobile computing devices, such as cellular phones and personal digital assistants, and network equipment, such as load balancers, routers and switches. Additionally, aspects in accord with the present invention may be located on a single computer system or may be distributed among one or more computer systems connected to one or more communication networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Thus, the invention is not limited to executing on any particular system or group of systems. Further, aspects may be implemented in software, hardware or firmware, or any combination thereof. Thus, aspects in accord with the present invention may be implemented within methods, acts, systems, system components using a variety of hardware and software configurations, and the implementation is not limited to any particular distributed architecture, network, or communication protocol. Furthermore, aspects in accord with the present invention may be implemented as specially-programmed hardware and/or software.

Figure 5:
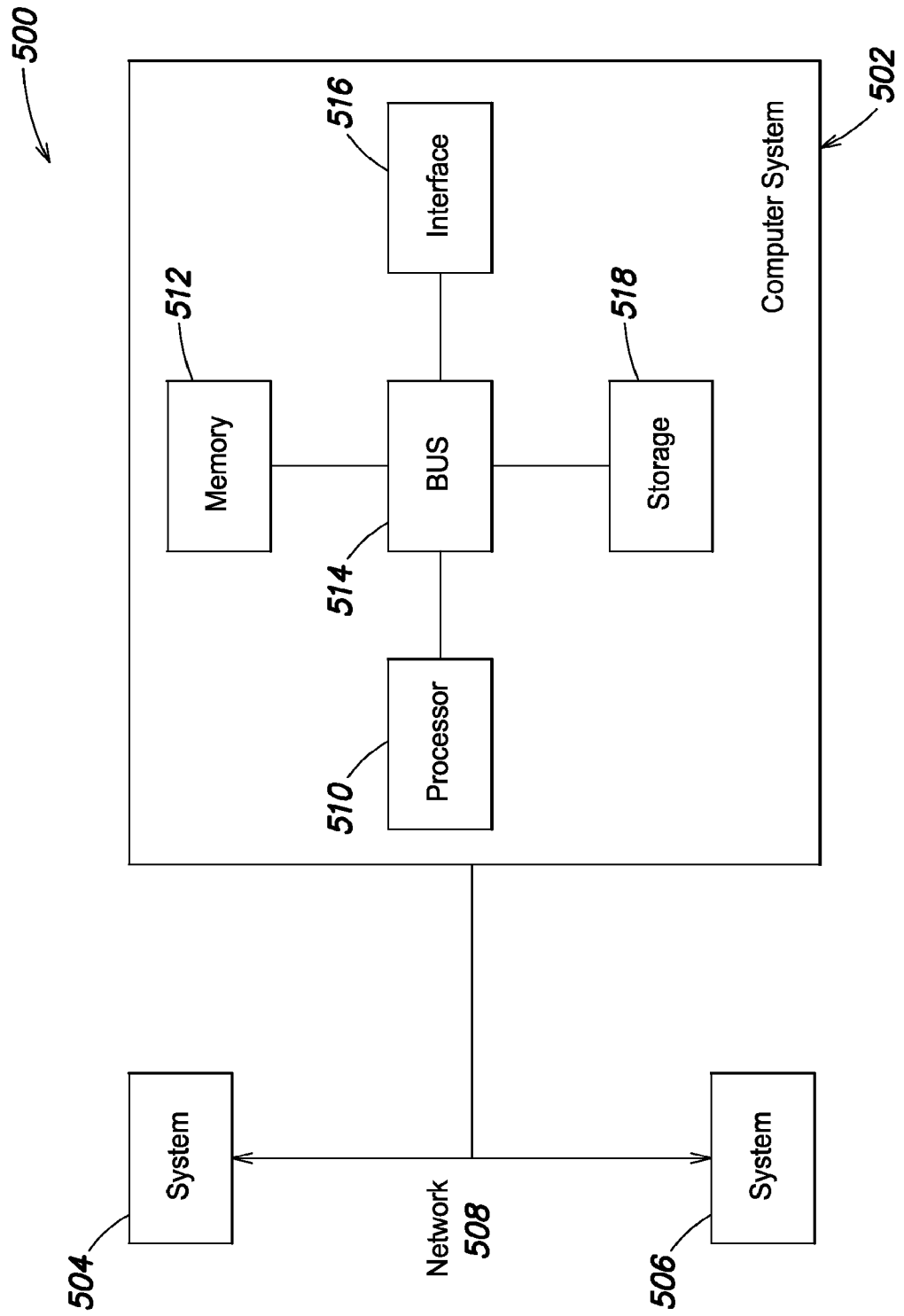
FIG. 5 is a block diagram of an exemplary computer system that may be specially configured to perform processes and functions disclosed herein.

FIG. 5 shows a block diagram of a distributed computer system 500, in which various aspects and functions in accord with the present invention may be practiced. The distributed computer system 500 may include one more computer systems that can be specially configured to perform the functions, operations, and/or processes disclosed herein. For example, as illustrated, the distributed computer system 500 includes three computer systems 502, 504 and 506. As shown, the computer systems 502, 504 and 506 are interconnected by, and may exchange data through, a communication network 508. The network 508 may include any communication network through which computer systems may exchange data. To exchange data via the network 508, the computer systems 502, 504, and 506 and the network 508 may use various methods, protocols and standards including, among others, token ring, Ethernet, Wireless Ethernet, Bluetooth, TCP/IP, UDP, HTTP, FTP, SNMP, SMS, MMS, SS7, JSON, XML, REST, SOAP, CORBA HOP, RMI, DCOM and Web Services.

Computer systems 502, 504 and 506 may include mobile devices such as cellular telephones. The communication network may further employ one or more mobile access technologies including 2nd (2G), 3rd (3G), 4th (4G or LTE) generation radio access for cellular systems, WLAN, Wireless Router (WR) mesh, and other communication technologies. Access technologies such as 2G, 3G, 4G and LTE and future access networks may enable wide area coverage for mobile devices. For example, the network may enable a radio connection through a radio network access such as Global System for Mobil communication (GSM), General Packet Radio Services (GPRS), Enhanced Data GSM Environment (EDGE), Wideband Code Division Multiple Access (WCDMA), among other communication standards. Network may include any wireless communication mechanism by which information may travel between the devices 504 and other computing devices in the network.

To ensure data transfer is secure, the computer systems 502, 504 and 506 may transmit data via the network 508 using a variety of security measures including TSL, SSL or VPN, among other security techniques. While the distributed computer system 500 illustrates three networked computer systems, the distributed computer system 500 may include any number of computer systems, networked using any medium and communication protocol.

Various aspects and functions in accord with the present invention may be implemented as specialized hardware or software executing in one or more computer systems including the computer system 502 shown in FIG. 5. As depicted, the computer system 502 includes a processor 510, a memory 512, a bus 514, an interface 516 and a storage system 518. The processor 510, which may include one or more microprocessors or other types of controllers, can perform a series of instructions that manipulate data. The processor 510 may be a well-known, commercially available processor such as an Intel Pentium, Intel Atom, ARM Processor, Motorola PowerPC, SGI MIPS, Sun UltraSPARC, or Hewlett-Packard PA-RISC processor, or may be any other type of processor or controller as many other processors and controllers are available. As shown, the processor 510 is connected to other system placements, including a memory 512, by the bus 514.

The memory 512 may be used for storing programs and data during operation of the computer system 502. Thus, the memory 512 may be a relatively high performance, volatile, random access memory such as a dynamic random access memory (DRAM) or static memory (SRAM). However, the memory 512 may include any device for storing data, such as a disk drive or other non-volatile storage device, such as flash memory or phase-change memory (PCM). Various embodiments in accord with the present invention can organize the memory 512 into particularized and, in some cases, unique structures to perform the aspects and functions disclosed herein.

Components of the computer system 502 may be coupled by an interconnection element such as the bus 514. The bus 514 may include one or more physical busses (for example, busses between components that are integrated within a same machine), and may include any communication coupling between system placements including specialized or standard computing bus technologies such as IDE, SCSI, PCI and InfiniBand. Thus, the bus 514 enables communications (for example, data and instructions) to be exchanged between system components of the computer system 502.

Computer system 502 also includes one or more interfaces 516 such as input devices, output devices and combination input/output devices. The interface devices 516 may receive input, provide output, or both. For example, output devices may render information for external presentation. Input devices may accept information from external sources. Examples of interface devices include, among others, keyboards, mouse devices, trackballs, microphones, touch screens, printing devices, display screens, speakers, network interface cards, etc. The interface devices 516 allow the computer system 502 to exchange information and communicate with external entities, such as users and other systems.

Storage system 518 may include a computer-readable and computer-writeable nonvolatile storage medium in which instructions are stored that define a program to be executed by the processor. The storage system 518 also may include information that is recorded, on or in, the medium, and this information may be processed by the program. More specifically, the information may be stored in one or more data structures specifically configured to conserve storage space or increase data exchange performance. The instructions may be persistently stored as encoded signals, and the instructions may cause a processor to perform any of the functions described herein. A medium that can be used with various embodiments may include, for example, optical disk, magnetic disk or flash memory, among others. In operation, the processor 510 or some other controller may cause data to be read from the nonvolatile recording medium into another memory, such as the memory 512, that allows for faster access to the information by the processor 510 than does the storage medium included in the storage system 518. The memory may be located in the storage system 518 or in the memory 512. The processor 510 may manipulate the data within the memory 512, and then copy the data to the medium associated with the storage system 518 after processing is completed. A variety of components may manage data movement between the medium and the memory 512, and the invention is not limited thereto.

Further, the invention is not limited to a particular memory system or storage system. Although the computer system 502 is shown by way of example as one type of computer system upon which various aspects and functions in accord with the present invention may be practiced, aspects of the invention are not limited to being implemented on the computer system, shown in FIG. 5. Various aspects and functions in accord with the present invention may be practiced on one or more computers having different architectures or components than that shown in FIG. 5. For instance, the computer system 502 may include specially-programmed, special-purpose hardware, such as for example, an application-specific integrated circuit (ASIC) tailored to perform a particular operation disclosed herein. Another embodiment may perform the same function using several general-purpose computing devices running MAC OS System X with Motorola PowerPC processors and several specialized computing devices running proprietary hardware and operating systems.

The computer system 502 may include an operating system that manages at least a portion of the hardware placements included in computer system 502. A processor or controller, such as processor 510, may execute an operating system which may be, among others, a Windows-based operating system (for example, Windows NT, Windows 2000/ME, Windows XP, Windows 7, or Windows Vista) available from the Microsoft Corporation, a MAC OS System X operating system available from Apple Computer, one of many Linux-based operating system distributions (for example, the Enterprise Linux operating system available from Red Hat Inc.), a Solaris operating system available from Sun Microsystems, or a UNIX operating systems available from various sources. Many other operating systems may be used, and embodiments are not limited to any particular operating system.

The processor and operating system together define a computing platform for which application programs in high-level programming languages may be written. These component applications may be executable, intermediate (for example, C # or JAVA bytecode) or interpreted code which communicate over a communication network (for example, the Internet) using a communication protocol (for example, TCP/IP). Similarly, functions in accord with aspects of the present invention may be implemented using an object-oriented programming language, such as SmallTalk, JAVA, C++, Ada, or C # (C-Sharp). Other object-oriented programming languages may also be used. Alternatively, procedural, scripting, or logical programming languages may be used.

Additionally, various functions in accord with aspects of the present invention may be implemented in a non-programmed environment (for example, documents created in HTML, XML or other format that, when viewed in a window of a browser program, render aspects of a graphical-user interface or perform other functions). Further, various embodiments in accord with aspects of the present invention may be implemented as programmed or non-programmed placements, or any combination thereof. For example, a web page may be implemented using HTML while a data object called from within the web page may be written in C++. Thus, the invention is not limited to a specific programming language and any suitable programming language could also be used.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

We claim:

1. A system for determining counting accuracy, the system comprising:
   a plurality of hand-held devices, at least one hand-held device configured to transmit an alert requesting a physical count of at least one product;
   at least one processor operatively connected to a memory and in communication with the plurality of the hand-held devices, an inventory system and an online system,
   the at least one processor is configured to:
      receive the alert requesting the physical count of the at least one product, from the at least one hand-held device;
      access a first set of information on current inventory associated with the at least one product from the inventory system;
      access a second set of information on the current inventory associated with the at least one product from the online system;
      determine a count frequency value based on the first or second set of information on the current inventory associated with the at least one product from the online system;
      dynamically adjust the count frequency value based on the first or second set of information on the current inventory associated with the at least one product from the online system;
      determine a validity of the alert requesting the physical count, based on the adjusted count frequency value;
      determine a counting value associated with counting the at least one product based on the first and second set of information, in response determining the validity of the alert requesting the physical count;
      determine a set of hand-held devices from the plurality of hand-held devices to associate with the at least one product;
      trigger physical counting of the at least one product responsive to evaluating the counting value against a counting threshold;
      transmit a validation message to the set of hand-held devices in response to triggering physical counting of the at least one product responsive to evaluating the counting value against a counting threshold, wherein an executable application is launched on the set of hand-held devices in response to receiving the validation message.

2. The system according to claim 1, wherein the valuation component is further configured to determine the counting value based at least in part on a determination of a presentation factor associated with the at least one product.

3. The system according to claim 2, wherein the valuation component is further configured to determine the presentation factor based on at least shelf capacity associated with the at least one product.

4. The system according to claim 3, wherein the valuation component is further configured to determine the presentation factor based on at least shelf capacity and case pack size associated with the at least one product.

5. The system according to claim 4, wherein the valuation component is further configured to calculate $$\left(\frac{(SC/CP)}{R_{target}}\right)^x$$

as part of determining the presentation factor, wherein SC is the shelf capacity for the at least one product, CP is the case pack size for the at least one product, $R_{target}$ is a system defined value for a target SC/CP ratio, and wherein x is an exponent having a value of 1, 2, 3, 4, or 5.

6. The system according to claim 1, wherein the at least one processor is configured to determine the counting value based at least in part on an on-hand factor, a presentation value, and a time factor.

7. The system according to claim 6, further comprising an act of communicating an approval or a denial of the request, responsive to the determination of the counting value.

8. The system according to claim 1, further comprising a communication component configured to receive a request to perform a physical count on inventory of the at least one product.

9. The system according to claim 8, wherein the communication component is configured to return an approval or a denial of the request responsive to the determination of the counting value.

10. A computer implemented method for determining counting accuracy, the method comprising:
   transmitting, via at least one hand-held of a plurality of hand-held devices, an alert requesting a physical count of at least one product;
   receiving, via a computer system in communication with the at least one hand-held device, an inventory system and an online system, the alert requesting a physical count of at least one product;
   accessing, by a computer system, a first set of information on current inventory associated with the at least one product from the inventory system;

accessing, by the computer system, a second set of information on current inventory associated with the at least one product from the online system;

determining, via the computer system, a count frequency value based on the first or second set of information on the current inventory associated with the at least one product from the online system;

dynamically adjusting, via the computer system, the count frequency value based on the first or second set of information on the current inventory associated with the at least one product from the online system;

determining, via the computer system, a validity of the alert requesting the physical count, based on the adjusted count frequency value;

determining, by the computer system, a counting value associated with counting the at least one product based on the first and second set of information, in response to determining the validity of the alert requesting the physical count;

determining, by the computer system, a set of hand-held devices from the plurality of hand-held devices to associate with the at least one product;

triggering, by the computer system, a physical counting of the at least one product responsive to evaluating the counting value against a counting threshold;

transmitting, via the computer system a validation message to the set of hand-held devices in response to triggering physical counting of the at least one product responsive to evaluating the counting value against a counting threshold, wherein an executable application is launched on the set of hand-held devices in response to receiving the validation message.

11. The method according to claim 10, wherein determining the counting value includes determining the counting value based at least in part on an on-hand factor, a presentation value, and a time factor.

12. The method according to claim 10, further comprising an act of receiving, by the computer system, a request to perform a physical count on inventory of the at least one product.

* * * * *